United States Patent [19]
Koschmann

[11] Patent Number: 5,204,867
[45] Date of Patent: Apr. 20, 1993

[54] METHOD AND APPARATUS TO DYNAMICALLY CONTROL THE RESONATOR GAIN OF A LASER

[75] Inventor: Eric Koschmann, Orlando, Fla.

[73] Assignee: Laser Photonics, Inc., Orlando, Fla.

[21] Appl. No.: 713,135

[22] Filed: Jun. 10, 1991

[51] Int. Cl.$^5$ .............................................. H01S 3/00
[52] U.S. Cl. ...................................... 372/33; 372/31; 372/38; 372/25; 372/10
[58] Field of Search .................................... 372/10-13, 372/25, 22, 33, 38, 81

[56] References Cited

U.S. PATENT DOCUMENTS

| | | | |
|---|---|---|---|
| 3,836,866 | 9/1974 | Ammann et al. | 372/12 |
| 4,197,513 | 4/1980 | Bell et al. | 372/12 |
| 4,896,326 | 1/1990 | Kafka et al. | 372/22 |
| 4,928,284 | 5/1990 | Burns | 372/13 |
| 5,016,251 | 5/1991 | D'Arcy | 372/10 |
| 5,018,152 | 5/1991 | Linne et al. | 372/25 |

OTHER PUBLICATIONS

Harigel et al., "Pulse Stretching in a Q-Switched Ruby Laser for Bubble Chamber Holography", *Applied Optics*, vol. 25, No. 22, Nov. 15, 1986, pp. 4102-4110.

Schmid, "Pulse Stretching in a Q-Switched Nd:YAG Laser", *IEEE Journal of Quantum Electronics*, vol. QE-16, No. 7, Jul. 1980, pp. 790-794.

*Primary Examiner*—Leon Scott, Jr.
*Attorney, Agent, or Firm*—Allen, Dyer, Doppelt, Franjola & Milbrath

[57] ABSTRACT

A method or apparatus for controlling the output pulse of a Q-switched laser. The intensity of laser light within the resonator of a Q-switch laser is sensed. A reference pulse related to a desired laser output pulse shape is compared with the sensed intensity. A variation signal corresponding to differences between the sensed light intensity and the reference pulse is fed to a Pockels cell or Q-switch within the resonator. The Q-switch responds to the variation signal by altering the resonator laser light polarization to maintain the Q-switch laser's output pulse in the desired shape. The reference pulse may be dynamically altered to change the shape of the output pulse.

18 Claims, 2 Drawing Sheets

METHOD AND APPARATUS TO DYNAMICALLY CONTROL THE RESONATOR GAIN OF A LASER

BACKGROUND OF THE INVENTION

This invention relates to regulating the output pulse of a Q-switched laser. More specifically, the invention relates to controlling a Q-switch laser output pulse by modifying the laser's resonator gain.

A pulsed Q-switched laser resonator will produce a very short output pulse of extreme intensity. The time duration of this pulse is determined by the physical constraints of the resonator; such as, the lasing medium, mirror spacing and reflectivities, excitation level, and others. These short pulses have very high peak power levels that can be detrimental to optics and to the desired effect on optic materials. In other words, the short Q-switched LASER output pulses can permanently damage optics, fiber optics, and the material to be processed.

Methods to stretch these output pulses have been reported with limited success for some types of lasers. In particular, two such techniques used to stretch a laser's output pulse are described as follows.

One method uses a high gain vacuum photodiode tube that is connected to a Pockels cell via a specially tuned circuit. When the Pockels cell is triggered, the laser begins to build up energy in the resonator and starts to lase. The photodiode detects this lasing action and feeds back a signal to the Pockels cell to slow down the rapid rise in light intensity within the resonator. The tuned circuit is coupled between the photodiode and Pockels cell to help control the amplitude of the signal from the photodiode and phase of the signal to enable the Pockels cell to stretch the resultant pulse. This method is reported by Harigel, et al. in "Pulse Stretching in a Q-Switched Ruby Laser for Bubble Chamber Holography", *Applied Optics*, Nov. 15, 1986. Unfortunately, this method must be constantly tuned to continue to produce the desired output pulse since other factors, such as the LASER excitation level, are constantly changing.

The second method involves a similar arrangement, but also includes a tuned circuit that applies a preprogrammed voltage waveform to the Pockels cell. This method has an added benefit that the desired output pulse shape is not entirely dependent on the photodiode's signal and the quality of the tuned circuit. Unfortunately, this method requires the designer of the tuned circuit that generates the preprogrammed voltage waveform to have an accurate model of the laser resonator's gain versus time for the desired output pulse shape. If other output pulse shapes or amplitudes are desired, then a totally new preprogrammed voltage waveform is required. Again, degradation or change of any of the laser physical constraints will incapacitate this method from performing properly.

SUMMMARY OF THE INVENTION

Due to the limitations of the above methods, a new apparatus was invented to effectively stretch the Q-switched output pulse of a laser dynamically. This new apparatus will stretch a Q-switch output pulse to follow any shape desired, and it will continue to do so even if the laser constraints vary or degrade over time.

This invention incorporates an operational amplifier that has a very large bandwidth and slew rate, connected in a high-gain configuration with an appropriate roll-off frequency. In this manner the operational amplifier performs a servo-mechanism feedback function. This function is accomplished as follows; the operational amplifier compares the laser output pulse to a reference input signal and varies its output voltage according to its gain function. The operational amplifier's output voltage varies the grid voltage on a high-speed vacuum tube which in turn controls the current flowing through the tube. This current flow causes the tube's anode plate voltage to fluctuate which causes the modulation of the Pockels cell voltage.

The Pockels cell, which is an electro-optical device inside the laser resonator, shifts the laser beam's polarization according to the voltage applied to it. This polarization change allows either more or less laser beam energy to be fed back into the resonator for continued amplification of the laser gain medium, which is preferably an Alexandrite laser rod in this case. By controlling the optical resonator in this manner the laser's output pulse shape can be controlled.

An optical detector located behind the resonator's high reflective rear mirror measures the laser pulse's height and temporal characteristics. This detector is connected back to the operational amplifier to close the feedback loop.

An object of this invention is to enable control of the laser's output pulse shape and amplitude, thereby controlling the laser's output energy.

Another object of this invention is that as the laser's operating parameters change; such as due to flashlamp degradation, the laser's output pulse is maintained in a predetermined shape.

A further object of this invention is to use a computer to control the Pockels cell reference parameters to obtain the desired laser output pulse width, energy and shape.

It is also an object to provide an improved method for regulating the shape of an output pulse of a Q-switched laser.

In a preferred embodiment these and other objects are provided with an apparatus for controlling the resonator gain of a Q-switch laser. The apparatus comprises a Q-switch laser resonator means for generating a Q-switch laser output pulse and for allowing laser light with an intensity to propagate through the laser resonator. The apparatus further includes means for sensing variations in the intensity of the laser light within the resonator, and a controller means responsive to the sensed laser light intensity variations for maintaining the laser resonator Q-switch output pulse in a predetermined shape when the intensity of the laser light in the resonator varies. Thus, the laser output pulse may be maintained to follow the reference pulse irrespective of changes in the laser's amplitude due to temperature or other environmental conditions.

DESCRIPTION OF THE PREFERRED EMBODIMENTS

Figure 1:
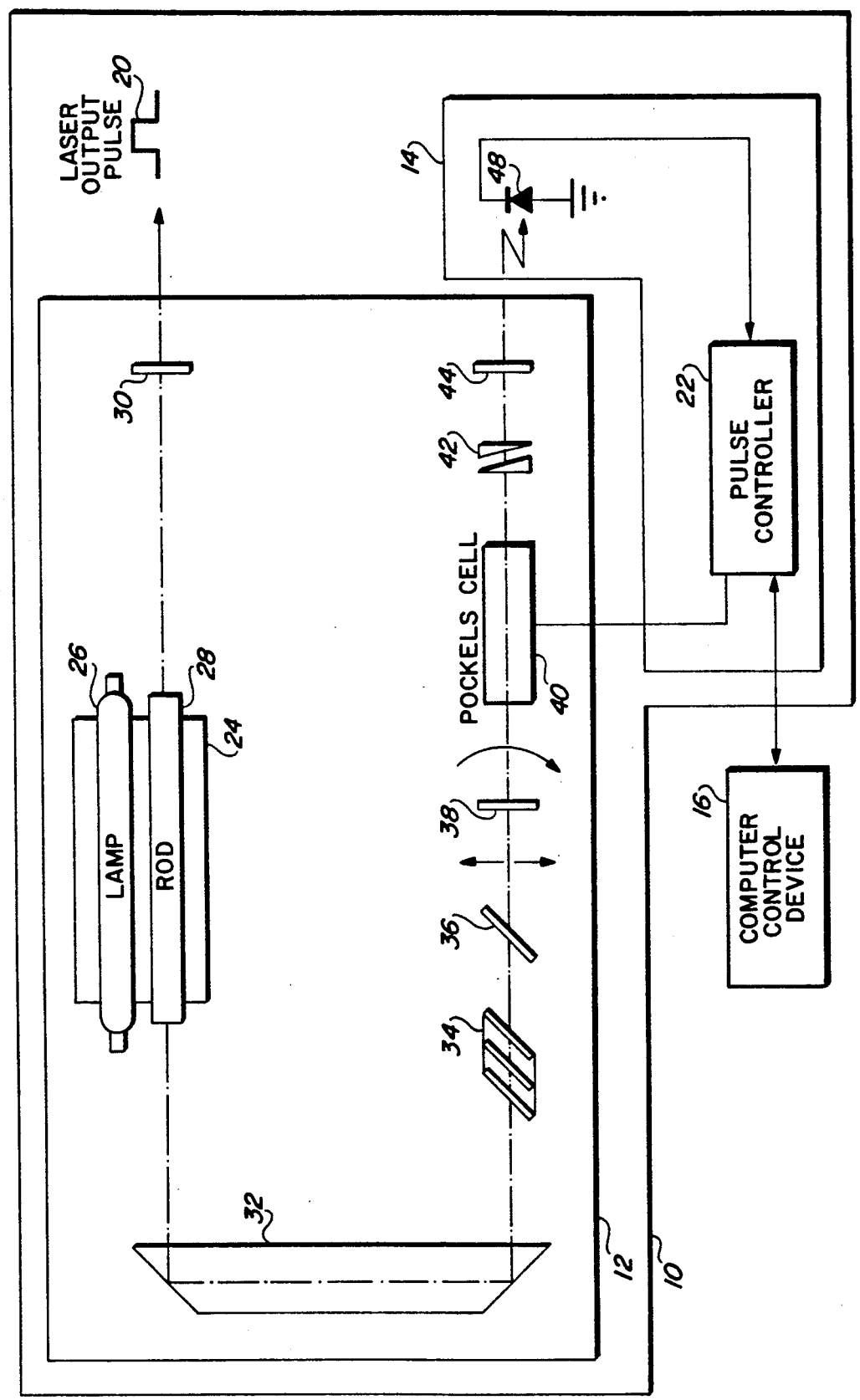
FIG. 1 is a block diagram of a Q-switched laser and the apparatus for controlling the resonator gain of the laser.

Referring to FIG. there is shown an apparatus for controlling the resonator gain of a laser generally designated by number 10 having a Q-switch laser resonator 12 coupled through a device 14 for maintaining the laser resonator output pulse in a predetermined shape to a computer control device 16. The Q-switch laser resonator 12 generates a Q-switched laser output pulse 20 in response to signals from pulse controller 22 within device 14.

Q-switch laser resonators 12 are generally known in the art and typically include a laser head 24 containing flashlamp 26 stimulating laser rod 28. Laser rod 28 responds to flashlamp 26 stimulation by emitting a laser light toward output coupler 30 and toward reflector 32. The output coupler 30 reflects laser light back into rod 28 while allowing a small amount of laser light to transmit through as laser output pulse 20. Reflector 32 redirects the laser light from rod 28 through birefringent tuner 34 and through thin film polarizer 36. Laser light is polarized with thin film polarizer 36 before passing through quarter-wave plate 38 where the laser light is circularly polarized.

Laser light from quarter-wave plate 38 is transmitted through a circularly polarizing Pockels cell 40, also referred to as a Q-switch. Pockels cell 40 receives an electrical variation correction from pulse controller 22 that controls the circular polarization of Pockels cell 40. The laser polarized by Pockels cell 40 is aligned while transmitting through wedges 42 onto the rear reflector 44. Rear reflector 44 reflects the laser light back through wedge 42, Pockels cell 40, etc. to output coupler 30.

Pockels cell 40 receives a variation correction signal in the form of a voltage level from pulse controller 22 in device 14. Pockels cell 40 responds to the variation correction by changing its circular polarization to regulate and maintain the intensity of the laser light in the laser resonator 12. Pockels cell 40 acts as a quarter-wave plate polarizing laser light passing therethrough. Laser light transmitted back through Pockels cell 40 is altered with quarter-wave plate 38 from being circularly polarized to being substantially vertically polarized.

Device 14 includes pulse controller 22 coupled to photo detector 48. Photo detector 48 senses the intensity of laser light being reflected off rear reflector 44 and provides a feedback signal to pulse controller 22 having an amplitude proportional to the intensity of the laser light within resonator 12. A preferred photo detector 48 is photodiode model no. MRD510 manufactured by Motorola Semiconductor of Tempe, Ariz. The feedback signal, corresponding to the sensed intensity from photo detector 48, is compared with a scaled reference pulse in controller 22. The variation between the scaled reference pulse and the feedback signal, referred to as a variation correction, is fed to Pockels cell 40. The magnitude of the scaled referenced pulse is controlled by computer control device 16. More details of controller 22 operation will be explained in FIG. 2.

Figure 2:
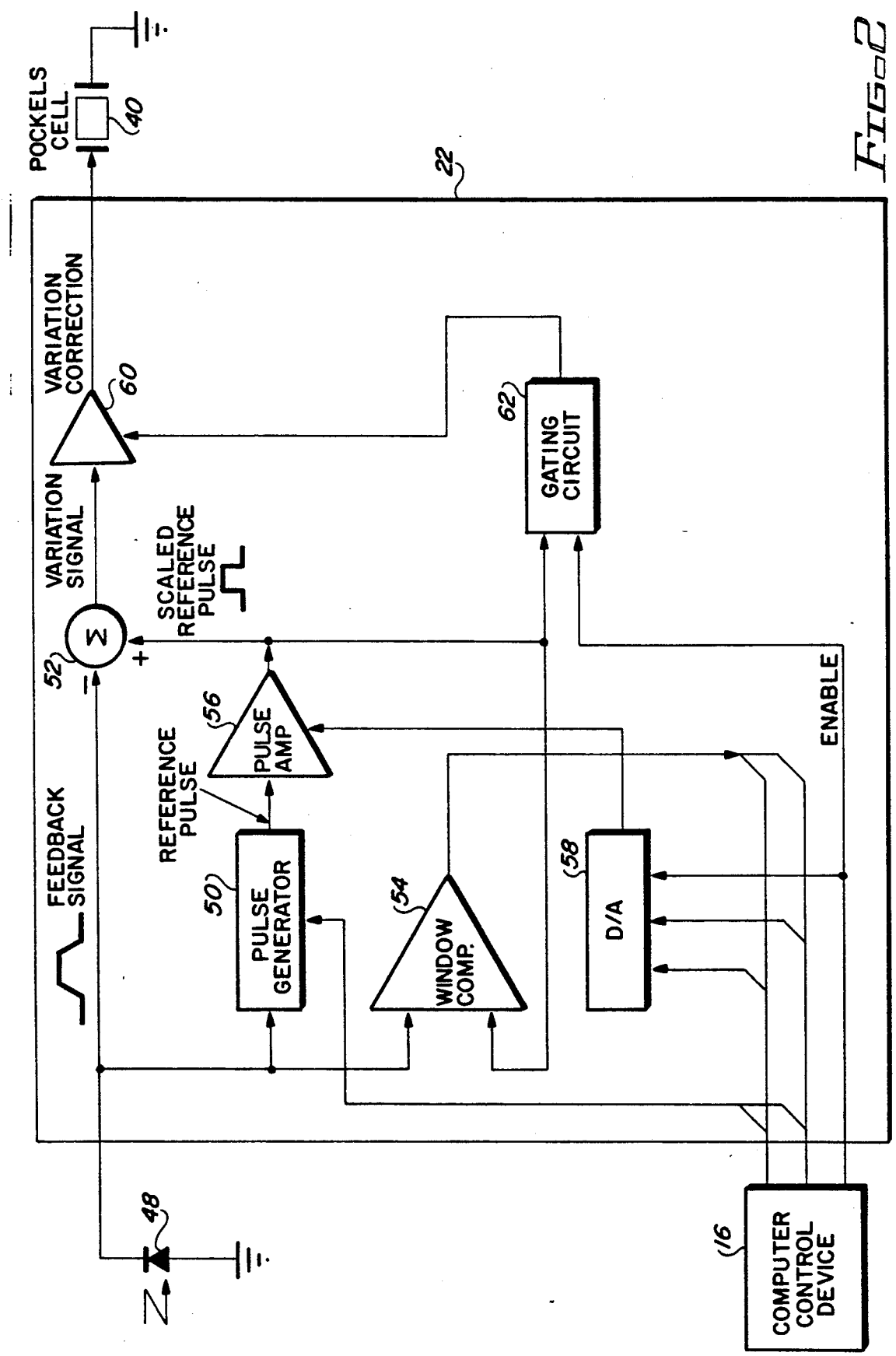
FIG. 2 is a simplified schematic diagram of the pulse controller shown in FIG. 1.

Referring to FIG. 2 there is shown the pulse controller 22 coupled to photo detector 48, Pockels cell 40 and computer control device 16. Pulse controller 22 responds to the feedback signal from photo detector 48 and computer control device 16 by generating a variation correction signal to regulate the voltage across Pockels cell 40.

Disposed within pulse controller 22 is pulse generator 50, summing amplifier 52 and window comparator 54, each of which are electrically coupled to photo detector 48. Pulse generator 50 is preferably an ultra-fast comparator which senses the feedback signal from photo detector 48. Pulse generator 50 responds to the feedback signal magnitude exceeding a predetermined reference voltage level by feeding a reference pulse to pulse amplifier 56 which is preferably a high-speed, multiplier/divider. Pulse amplifier 56 is coupled to a digital to analog (D/A) convertor 58 and scales the reference pulse fed from pulse generator 50 by a scaler signal fed from D/A convertor 58. The output of amplifier 56 is fed to summing amplifier 52 positive terminal and the feedback signal is fed to summing amplifier 52 negative terminal. Although the amplitude of the reference pulse is shown scaled and then fed to summing amplifier 52, the reference pulse may be directly fed to summing amplifier 52. Further, pulse generator 50 may be modified by known techniques to change the duration of the reference pulse in response to signals from computer control device 16. This output of pulse amplifier 56 is generally referred to as a scaled reference pulse which will be the desired Q-switch laser output pulse 20.

Summing amplifier 52 compares the scaled referenced pulse to the feedback signal and generates a variation signal corresponding to the difference between the two pulses. This variation signal is fed by summing amplifier 52 to the grid terminal of tube amplifier 60.

Tube amplifier 60 is preferably model number EIMAC Y654 planar triode manufactured by Varian Corporation of Salt Lake City, Utah. Although a tube amplifier is preferred, the device is not limited to a tube amplifier but may include solid state amplification devices. Tube amplifier 60 responds to the variation signal from summing amplifier 52 and an enable signal from gating circuit 62 by providing a variation correction to Pockels cell 40. This variation correction has a very high voltage level that fluctuates with the variation signal to regulate laser output pulse 20. The variation correction is initially very small to effectively disable Pockels cell 40. Pockels cell 40 responds to an increase in voltage level of the variation correction signal by aligning its circular polarity with that of quarter-wave plate 38. The alteration in circular polarity changes the laser intensity in resonator 12, thereby controlling the laser output pulse 20 by increasing laser rod 28 laser light amplitude.

Window comparator 54 compares the feedback signal from photo detector 48 with the scaled reference pulse and provides indication signal corresponding to the level of the feedback signal to computer 16. If the feedback signal exceeds a first predetermined threshold or does not exceed a second predetermined threshold, computer 16 is alerted and may thus shut down the system.

Computer control device 16 feeds a digital control signal to D/A convertor 58. The scaling signal fed to D/A convertor 58 preferably has eight bits corresponding to a level or amplitude multiplification factor that is fed to pulse amplifier 56. Accordingly, the intensity of the laser output pulse 20 may be dynamically adjusted between successive pulses by computer control device 16 changing the scales between pulses.

Computer 16 also feeds an enable pulse to gating circuit 62. Gating circuit 62 is also fed the scaled reference pulse from pulse amplifier 56. Gating circuit 62 responds to the pulse from computer control device 16 by enabling tube amplifier 60. Gating circuit 62 disables tube amplifier 60 after receiving the trailing edge of the scaled reference pulse. Thus, tube amplifier 60 is enabled for one pulse at a time in response to signals from computer control device 16.

The feedback signal is monitored and then compared with the scaled reference pulse to generate a variation signal. A voltage level corresponding to the variation signal is fed to the Pockels cell 40. By altering the polarization of the laser light in laser resonator 12 in response to intensity variations from a reference, the resonator laser output pulse 20 may be maintained to follow any reference pulse.

This concludes the description of the preferred embodiments. A reading by those skilled in the art will bring to mind various changes without departing from the spirit and scope of the invention. It is intended, however, that the invention only be limited by the following appended claims.

What is claimed is:

1. An apparatus for controlling the resonator gain of a Q-switched laser, the apparatus comprising:
    laser resonator means including a Q-switch for generating a Q-switched laser output pulse having a predetermined shape;
    means within said resonator means for sensing variations in intensity of laser energy within said resonator means; and
    controller means responsive to an output of said sensing means for regulating the shape of said Q-switch output pulse to maintain the predetermined shape.

2. The apparatus as recited in claim 1 further comprising:
    means for providing a signal correspondence to a second predetermined output pulse shape; and
    means for modifying said output pulse responsive to said signal.

3. The apparatus as recited in claim 1 further comprising:
    means for providing a reference pulse when said laser light reaches a predetermined intensity in said resonator; and
    means for activating said Q-switch when said reference pulse is provided.

4. The apparatus as recited in claim 1 further comprising means for generating a reference signal corresponding to said predetermined shape.

5. The apparatus as recited in claim 4 further comprising means for generating a variation signal corresponding to said reference signal.

6. The apparatus as recited in claim 1 further comprising means for generating a feedback signal corresponding to the intensity of said laser light in said resonator means.

7. The apparatus as recited in claim 1 further comprising means for indicating when said output pulse exceeds a predetermined threshold.

8. The apparatus as recited in claim 1 further comprising means for providing an indication when said output pulse has a minimum amplitude below a predetermined threshold.

9. A Q-switched laser apparatus comprising:
    a laser resonator having a Pockels cell capable of making polarization changes, the Pockels cell optically coupled to a laser head, the resonator generating a laser output pulse;
    said Pockels cell regulating the intensity of the laser light within said resonator by changing the polarization of the light within said resonator in response to a variation correction;
    a photo detector sensing the intensity of laser light within said resonator and providing a feedback signal representative of the intensity of the light within said resonator;
    a comparator providing a reference pulse;
    a summing amplifier receiving said reference pulse and said feedback signal and generating a variation signal having a magnitude corresponding to the variation of the feedback signal from the reference pulse; and
    means responsive to said variation signal for providing the variation correction to said Pockels cell, the variation correction related to the magnitude of said variation signal.

10. The Q-switched laser apparatus as recited in claim 9 wherein said comparator generates the reference signal when the feedback pulse has a magnitude that exceeds a predetermined reference.

11. The Q-switched laser apparatus as recited in claim 9 further comprising means for altering the reference pulse.

12. The Q-switched laser apparatus as recited in claim 9 wherein said summing amplifier generates the variation signal with a voltage level amplitude that varies in response to said resonator laser intensity variation from a predetermined reference.

13. The Q-switched laser apparatus as recited in claim 9 further comprising means for providing an indication when said laser output pulse exceeds a predetermined threshold.

14. The Q-switched laser apparatus as recited in claim 9 further comprising
    means responsive to said feedback signal for indicating when said laser output pulse varies from said reference pulse by more than a predetermined amount.

15. A method for controlling the gain of a laser resonator having a Pockels cell and through which a laser light with varying intensity propagates, the method comprising the steps of:
    periodically generating laser output pulses with said Pockels cell;
    sensing variations of laser light intensity within said resonator; and
    maintaining said laser output pulse in a predetermined shape in response to the sensed variations.

16. The method as recited in claim 15 further comprising the step of modifying voltage levels across said Pockels cell in response to said sensed variations to maintain said predetermined shape of said output pulse.

17. The method as recited in claim 15 further comprising the steps of:
    providing a control signal corresponding to a second predetermined shape; and
    changing said predetermined shape to the second predetermined shape in response to said control signal.

18. A laser resonator comprising:
    a laser rod and pump for generating an output of coherent energy;
    means within the laser resonator for shaping the coherent energy output into pulses having predetermined characteristics;
    means for detecting variations in the pulses within the resonator with respect to the predetermined characteristics and providing an output representative of the variations; and
    means responsive to the detecting means output for regulating the shaping means to maintain an output with pulses having the predetermined characteristics.

* * * * *